G. F. DUNN.
MACHINE FOR SNIPPING VAMPS.
APPLICATION FILED APR. 27, 1909.
1,057,378.
Patented Mar. 25, 1913.
4 SHEETS—SHEET 2.
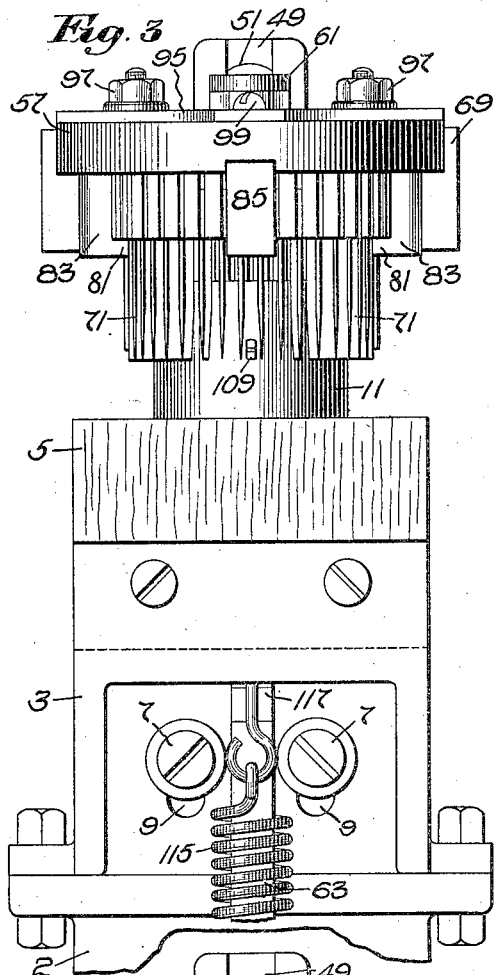
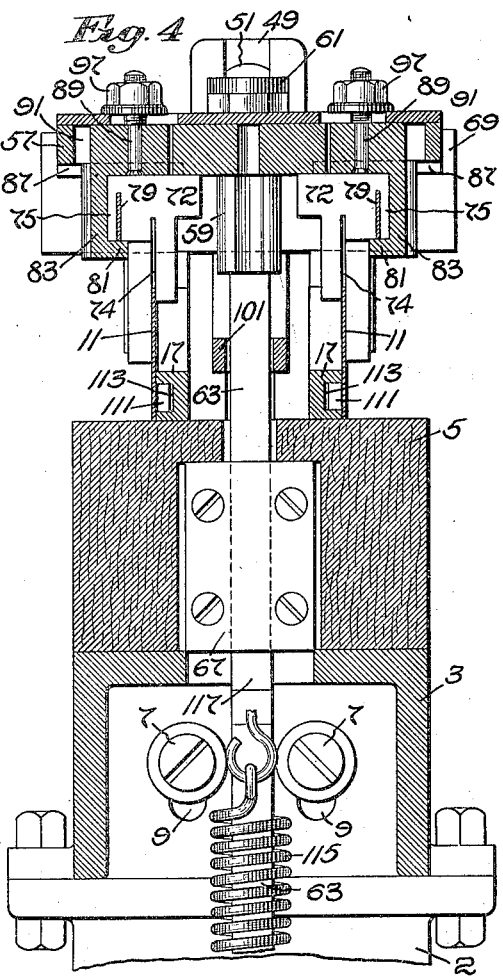
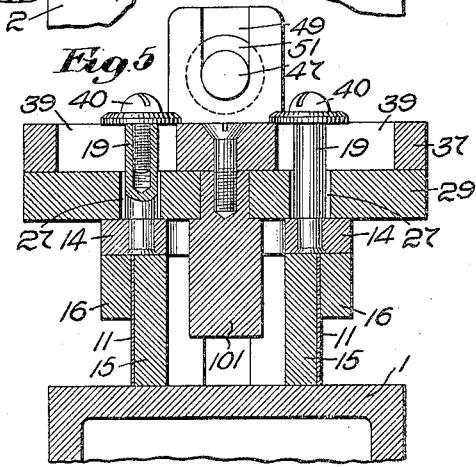
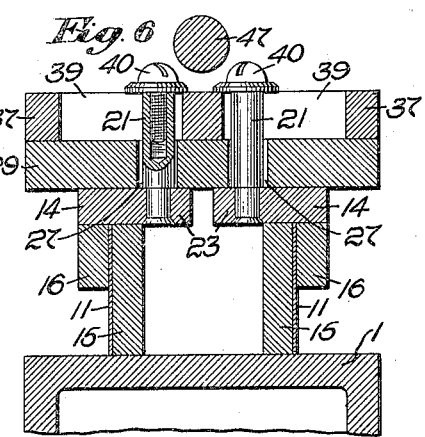
Witnesses:
Horace A. Crossman
Robert H. Kammler
Inventor:
George F. Dunn.
by Emery & Booth
attys

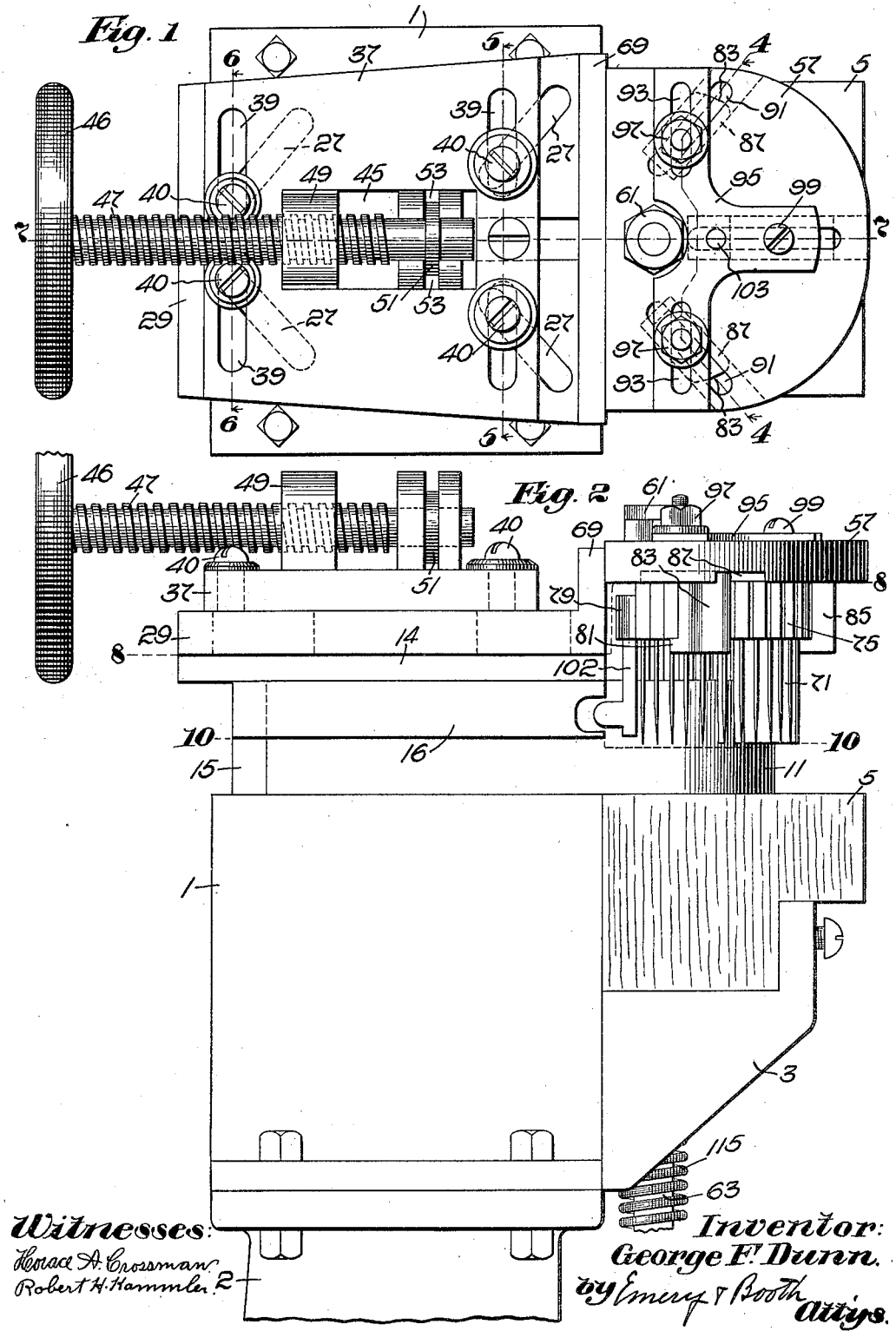

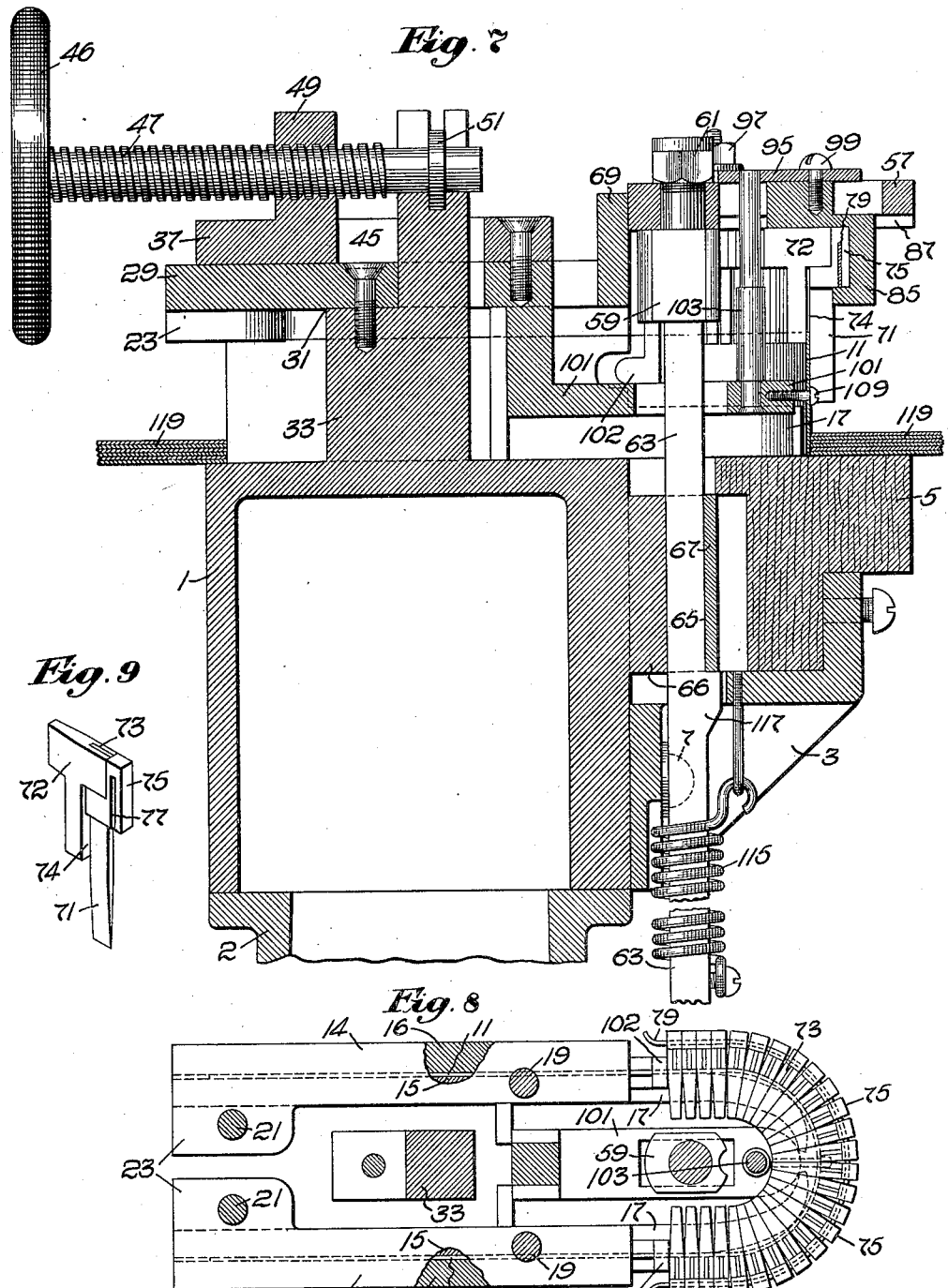

G. F. DUNN.
MACHINE FOR SNIPPING VAMPS.
APPLICATION FILED APR. 27, 1909.

1,057,378.

Patented Mar. 25, 1913.
4 SHEETS—SHEET 4.

Witnesses:
Horace A. Crossman
Robert H. Hammler

Inventor:
George F. Dunn.
by Emery & Booth
Attys.

UNITED STATES PATENT OFFICE.

GEORGE F. DUNN, OF BROCKTON, MASSACHUSETTS, ASSIGNOR OF ONE-HALF TO WILLIAM B. ARNOLD, OF NORTH ABINGTON, MASSACHUSETTS.

MACHINE FOR SNIPPING VAMPS.

1,057,378. Specification of Letters Patent. Patented Mar. 25, 1913.

Application filed April 27, 1909. Serial No. 492,580.

*To all whom it may concern:*

Be it known that I, GEORGE F. DUNN, a citizen of the United States, and a resident of Brockton, in the county of Plymouth and Commonwealth of Massachusetts, have invented an Improvement in Machines for Snipping Vamps, of which the following description, in connection with the accompanying drawings, is a specification, like letters on the drawings representing like parts.

My invention relates to machines for snipping boot and shoe vamps and the like and among other objects aims to provide a machine which may be adjusted to conform to vamps of different shapes and sizes.

Figure 10:
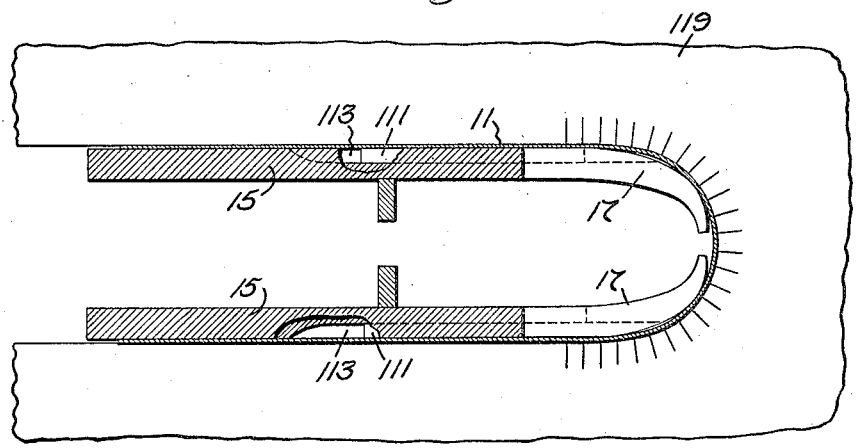
Figure 11:
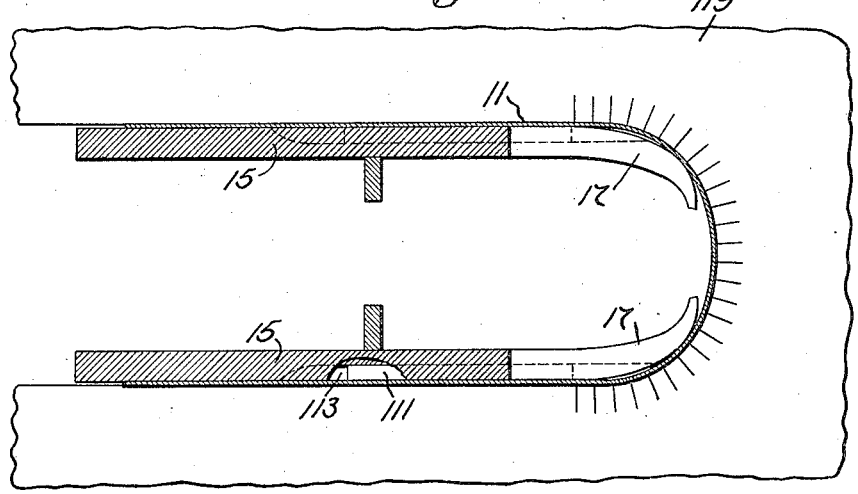

My invention may be best understood by reference to the following description of an illustrative embodiment thereof shown in the accompanying drawing wherein:

Figure 1 is a plan view of a vamp snipping machine embodying my invention; Fig. 2 is a side elevation thereof; Fig. 3 is a front elevation thereof; Fig. 4 is a transverse vertical section taken on the irregular line 4—4 of Fig. 1; Fig. 5 is a transverse vertical section taken on the line 5—5 of Fig. 1; Fig. 6 is a transverse vertical section taken on the line 6—6 of Fig. 1; Fig. 7 is a longitudinal vertical section taken on the line 7—7 of Fig. 1; Fig. 8 is a horizontal section taken on the line 8—8 of Fig. 2; Fig. 9 shows in perspective a snipping blade and its support; Fig. 10 is a horizontal section taken on the line 10—10 of Fig. 2; and Fig. 11 is a similar view showing the parts adjusted into a different position.

The vamp snipping machine herein shown as embodying my invention (Fig. 2) comprises a base 1 which may be mounted on any suitable support, herein a column 2, shown partly broken away. Connected to the front of said base by screws 7 (Figs. 3 and 4) is an adjustable shelf 3 supporting a cutter bed 5 of wood or other material, said screws passing through elongated slots 9 in said shelf. The surface formed by the top of the base and the cutter bed constitutes a work table for the blank vamps to be operated upon as more fully hereinafter described. To assist in positioning the vamps on said table I have provided a guide comprising a flexible metal strip or spring 11 (Figs. 3 and 8) substantially U-shaped to conform to the contour of the usual vamp throat. The curved portion of the guide is positioned over the cutter bed and its legs extend rearwardly on said base. To permit adjustment of said guide to conform to the contour of vamp throats of different sizes, the legs of this spring guide 11 are held in adjustable supports (Figs. 5 and 6) each comprising a plate 14 having two depending strips or plates 15, 16 one deeper than the other, the deeper plate extending to the surface of said base 1. These plates receive between them and retain the legs of the spring 11 which rest against and are supported throughout their depth by the wider plate 15. The curved portion of the U (Fig. 8) extends forwardly free from said legs and assumes a natural curvature which is modified somewhat by interior guide fingers 17 (Figs. 8 and 10) extending forwardly from the side plates 15. These fingers curve toward one another and each touches the spring at a point a little to one side of the central point of the curve. The arc of the U is substantially circular (Fig. 9) when the guide is contracted to its smallest adjustment but as said guide is expanded the spring bends about said guide fingers and its curve may be flattened somewhat (Fig. 10). This change of curve is of importance since the curves of the throats of larger vamps are usually flatter than those of smaller size. It will be apparent that the guide will thus be adapted by its adjustments accurately to fit vamps of a wide range of sizes.

The guide leg supports 13 referred to may be moved toward and from each other to effect the above described adjustments in any suitable manner, herein by providing each back plate 14 with a front upwardly projecting pin 19 (Fig. 5) and a similar rear pin 21 (Fig. 6) the latter projecting from a lateral ear 23 (Fig. 8) integral with said plate. These pins project upwardly through oblique cam slots 27 (Fig. 1) in a horizontal cam plate 29. This cam plate is secured upon a ledge 31 (Fig. 7) of a post 33 which rises centrally from said base 1 and is preferably integral therewith. Said pins with their supports may be moved toward or from one another by a sliding plate 37 resting upon said cam plate 29 and provided with transverse slots 39 crossing the oblique slots in said cam plate. Said pins extend upward through these superposed slots and with the legs of the guide are held suspended by set screws 40 (Figs. 5 and 6) in the ends of said pins, and overlying washers a sshown. The post 33 rises through an elongated opening 45 in the sliding plate 37 and constitutes a guide therefor. The sliding plate may be moved relatively to the cam plate by any suitable means such as a hand wheel 46 at one end of a screw 47 which has a threaded engagement with a lug 49 projecting upwardly from the face of said sliding plate and has at its opposite end a collar 51 engaging vertical slits 53 (Fig. 1) in a bifurcated end of the stationary post 33. When the sliding plate is moved the pins projecting from the leg supports upwardly through said crossing slots will be moved forwardly or rearwardly by the transverse slots according to the direction in which the screw is turned, and at the same time will be guided inwardly or outwardly by the oblique slots in said cam plate, thereby moving the legs of the U-shaped guide toward or from each other as described to vary the curvature of the end of the U.

Having described the vamp guide and its adjustment, I will now describe the snipping jaw which may also be adjusted, with said guide, for accurately snipping the throats of the vamps of different sizes positioned by said guide. This jaw (Figs. 2, 3 and 7) is located at the front of the machine above the curved portion of said guide and comprises a substantially semi-circular cutter head 57 (Figs. 1, 2 and 7) clamped between a shoulder 59 and a nut 61 on a vertical rod 63. This rod is guided by and is adapted to reciprocate in a vertical groove 65 (Figs. 4 and 7) in a forward extension 66 of the base 1, said rod being retained therein by a removable cover plate 67. Any turning of said head 57 is prevented by the engagement of its straight rear edge with the flat vertical face of an upturned end 69 (Figs. 1 and 7) of the cam plate 29 referred to. This head 57 constitutes the support for a series of tooth-like snipping blades 71 (Fig. 8) which are arranged side by side in an arc conforming to the curved portion of the guide referred to.

Each blade is held in a T-shaped support 72 (Fig. 9), the shank of the blade being set in a vertical groove 73 in an end of the horizontal member of the T and depends therefrom parallel to the vertical member of said T, but spaced therefrom to leave a guide slit 74 which is adapted to receive the edge of the curved guide strip referred to. Therefore any adjustment of said guide will effect corresponding adjustment of said cutter blades. The opposite end of the horizontal member of the T is tapered (Figs. 8 and 9) to permit the blade supports to be arranged closely and adjustably in the form of an arc. Each blade support is provided with an angular supporting head 75 having a vertical blade receiving groove registering with the blade receiving groove in said T. This supporting head has a vertical slit 77 parallel with the guide slot 74 referred to, said slot receiving a narrow flexible strip or spring 79 resting upon the inturned ends 81 of two side brackets 83 and an intermediate bracket 85 depending from the cutter head 57. These brackets are adapted to slide in radial grooves 87 (Fig. 4) in the under face of said cutter head 57. The side brackets 83 are each provided with a pin 89 projecting upwardly through slots 91 opening into said grooves 87. These pins also project through transverse cam slots 93, in a T-plate 95 adapted to slide on the top of said cutter head. The brackets 83 are drawn up into their grooves by nuts 97 and overlying washers. The intermediate bracket, unlike said side brackets, is screwed directly to said T-plate (Fig. 7) and moves positively therewith. When the brackets are set up into their grooves the backs (Fig. 4) of the blade supports 72 will be drawn up firmly into engagement with the under face of the cutter head. These brackets may be slid in their grooves to vary the curve of the blade supporting spring 79 simultaneously as the U-guide is adjusted by a tongue 101 (Fig. 7) extending downwardly and then forwardly from the sliding plate 37 referred to. This tongue is connected to said T-plate 95 by a vertical pin 103 secured to the forward end thereof projecting up through the intermediate bracket slot in said head plate. The blade supports received by said U-guide are prevented from spreading by stops 108 (Fig. 2) fixed to said guide and engaging the end blades of the jaw.

The curved portion of the guide may be more positively controlled by attaching the same to the tip of the tongue 101 as by a screw 109 (Fig. 7). As a result of this connection the guide will be moved longitudinally on the cutter bed with said tongue. As the legs of the guide are separated, the length of the curved portion of the guide spring will be increased and the overall length of the spring will be shortened causing a relative movement between said spring and the leg supports. To permit this movement said spring is guided in the leg supports by tongues 111 (Fig. 4) projecting from the inner faces of the legs of said spring and sliding in corresponding horizontal grooves 113 in the outer faces of the leg supporting plates 15.

The cutter head with its rod may be reciprocated in any suitable manner to bring the cutting ends of the blades down to the cutter bed. The cutter head herein is normally held up from the cutter bed in readiness to make a snipping stroke by a helical spring 115 (Fig. 7), encircling the rod 63 and having one end connected to the shelf 3 referred to and the opposite end to said rod and is limited in its upward movement by a stop 117 on said rod adapted to engage the lower edge of the cover plate 67.

In use one or preferably a plurality of superposed vamps 119 (Fig. 7) are placed flat and unfolded on the cutter bed. The hand-wheel 46 is then turned to adjust the guide, accurately to fit the counter of the vamp throats, the curve formed by the adjacent snipping blades 71 being simultaneously varied by the radially movable blade supporting brackets 83 and 85, supported by the cutter head 57, said brackets being adjusted by the sliding T-plate 95 which is connected to move with the sliding plate 37 as described. The snipping blades in intimately following the change of curve of said guide as the latter is adjusted, will always be properly positioned to form cuts extending equal distances from the edge of the vamp throat which accurately fits the contour of the guide.

The crown of the curved portion of the vamp throat guide conforms to the corresponding portion of the vamp throat in the various positions of adjustment of the said guide.

After the guide is adjusted to fit the vamp throats, the cutter head 57 is brought down by its operating rod 63 toward the cutter bed and the blades carried by said head snip through the vamp or superposed vamps thereon, making snips of equal depth in the edge portions of the vamp throats.

Heretofore, so far as I am aware, it has been the practice to use a guide of one size for snipping vamps of different sizes. If for example a vamp, which is smaller than said guide, is placed thereon, it will not fit around the guide without puckering at the throat. To avoid this puckering the vamp has been folded with its legs superposed, so that the throat of the vamp will extend around a small portion only of the curved portion of the guide. But even when folded the contour of the folded throat does not conform to the curve of the guide and when some portions of the arc of the vamp throat touch the guide other portions will be spaced therefrom. As a result the blades will snip cuts of one depth at the ends of the arc and cuts of a different depth in the intermediate portions of said arc. When the snipped throat portion is turned under with a depth of fold equal to the shorter snips, the longer snips will be objectionably visible on the side opposite from said fold. If the vamp throat is larger than said guide it also will not fit the latter when flat, nor even when folded, the end portions of the arc being spaced from the guide when the center of the arc is contiguous thereto. Here again snips of unequal extent result with the same objection as before. It is found to be impractical to superpose folded vamps since they tend to spring up and do not remain accurately folded, and therefore but one vamp can be snipped at a time, resulting in slow operation. Even when snipped singly the vamps frequently are not accurately folded and this also is a cause of unequal snips. Also in the effort to make a vamp throat of one size conform to a guide of a different size the operative frequently pushes the vamp throat too forcibly against the guide and because of the pliable nature of the vamp material, that portion of the throat curve which is closest to the guide is turned under and again snips are made in some portions of the throat longer than in other portions. By my invention I have overcome the above and other defects.

In the use of my machine the vamps are not folded but are placed flat on the cutter bed and the guide is adjusted accurately to conform to the contour of the throat of whatever size and hence leaves no portion of the edge of the vamp throat spaced from the guide so that when the snipping blades are brought down, snips of equal extent in the edge portion of the throat are assured. Being flat and unfolded a plurality of vamps may be readily superposed and serve to stiffen one another, thereby eliminating any liability of their edges being turned under when pushed up to said guide and also a plurality may be snipped by a single snipping stroke of the blades, resulting in increased output of the machine. Moreover, the machine may be run at a higher speed than heretofore, since the vamps because of their accurate fit on the guide may be placed quickly thereon without the previous painstaking feed necessary when the attempt was made to make a vamp of one size fit a guide of a different size.

It will be understood that my invention is not limited to the particular embodiment disclosed herein but that various modifications may be made without departing from the spirit of my invention.

Claims:

1. In a machine of the class described the combination of a work table, and a snipping jaw coöperating therewith comprising a flexible carrier, a plurality of blades supported by the latter and means simultaneously to flex said carrier and distribute said blades thereon.

2. In a machine of the class described the combination of a work table and a snipping jaw coöperating therewith comprising a curved, flexible carrier, a plurality of contiguous blade supports thereon and means to flex said carrier and distribute said blade supports thereon.

3. In a machine of the class described the combination of a work table and a snipping jaw coöperating therewith comprising a curved, flexible carrier, a plurality of blade supports thereon having tapered, radial portions and means to flex said carrier and distribute said supports thereon.

4. In a machine for snipping vamps, the combination of a work table and a substantially U-shaped, adjustable, conformable guide thereon and means to flatten the curved portion of said guide to conform to vamp throats of different contour.

5. A machine for snipping vamps comprising in combination a work table, reciprocable snipping blades and an adjustable vamp throat guide mounted upon said table, means to adjust said guide to vamp throats of different sizes, and connections for adjusting said blades through the instrumentality of said guide.

6. A machine for snipping vamps comprising in combination a work table, adjustable reciprocable snipping blades, and an adjustable vamp throat guide constituting means for adjusting said blades to conform to the contour of the guide.

7. In a machine for snipping vamps, the combination of a substantially U-shaped vamp throat guide, means to adjust the legs of the latter toward and from one another, means to vary the curvature of said guide and snipping blades movable with the latter.

8. A machine for snipping vamps comprising in combination a work table, adjustable reciprocable snipping blades, an adjustable vamp throat guide connected to said blades to adjust the latter to conform to the contour of the guide, and means for adjusting said guide.

9. A machine for snipping vamps comprising in combination a work table, an adjustable vamp throat guide and reciprocable snipping blades adjustable through the instrumentality of said guide.

10. In a machine for snipping vamps, the combination of a work table, a reciprocable cutter head, adjustable brackets supported thereby, arcuately arranged snipping blades supported by said brackets, and a vamp throat guide, said brackets being adjustable through the instrumentality of said guide, thereby to vary the curved arrangement of said blades.

11. In a machine for snipping vamps, the combination of a work table, an expansible vamp throat guide thereon comprising a support provided with forwardly extended guide fingers and a substantially U-shaped flexible strip carried by said support and guided by said fingers.

12. In a machine for snipping vamps, the combination of a work table, an expansible vamp throat guide thereon comprising supports provided with forwardly extended guide fingers, a substantially U-shaped flexible strip having its legs longitudinally movable in said supports to compensate for the change of curvature of said strip as said guide is adjusted.

13. In a machine for snipping vamps, the combination of a substantially U-shaped guide, means to alter the convexity thereof by varying its curvature, and snipping blades adjustable to the guide in its varying curvature.

14. In a machine for snipping vamps, the combination of a work table, a cutter head mounted above said table, snipping blades carried by said head, an expansible vamp throat guide constituting guiding means for said blades and means for transmitting a cutting stroke to said head.

15. In a machine for snipping vamps, the combination of a work table, a cutter bed carried thereby, a post projecting upwardly from said table, a cam plate fixed thereon and spaced from said table, a sliding plate superposed on said cam plate, a U-shaped guide, pins projecting upwardly therefrom and extending through cross slots in said plates, means to move said sliding plate to expand or contract said guide and slipping blades adjustable with the latter.

16. In a machine for snipping vamps, the combination of a base, a cutter bed carried thereby, a post projecting upwardly from said base, a cam plate on said post, a sliding plate superposed on said cam plate, a U-shaped guide, pins projecting upwardly therefrom through cross slots in said plates; a cutter head above said cutter bed, a sliding plate thereon, brackets having pins extending through cross slots in said head and plate, snipping blades depending from said brackets and means simultaneously to vary the curve of said guide and blades to conform to vamp throats of different sizes.

17. A machine for snipping vamps comprising, in combination, snipping blades; and an adjustable vamp throat guide constituting means for positioning said blades.

18. In a machine for snipping vamps, the combination of a work table, a cutter head, snipping blades supported thereby, and an expansible vamp throat guide, said guide constituting means for positioning said blades in conformity to expanded positions of said guide.

19. A machine for snipping vamps comprising in combination snipping blades, a combined blade-and-vamp-throat guide of variable curvature, and means to vary the curvature of said guide, thereby to conform the guide to vamps of differing contour and to adjust said blades in accordance with said contour.

20. A machine for snipping vamps comprising in combination an adjustable vamp throat guide conformable to curved portions of a vamp throat, and snipping blades conformable to curved portions of said guide, and adjustable through the instrumentality of said curved portions of the guide.

21. A machine for snipping vamps comprising in combination an adjustable vamp throat guide conformable to the curved portion of a vamp throat, and snipping blades conformable, through said guide, to the said curved portions of the vamp throat.

22. A machine for snipping vamps comprising in combination a vamp throat guide having an adjustable curved middle part conformable to the curved portion of a vamp throat, and snipping blades adjustable to conform to the contour of the middle portion of said guide.

23. A machine for snipping vamps comprising in combination a vamp throat guide having a curved part whose crown conforms to the corresponding portion of a vamp throat, and snipping blades adjustable to the crown of said guide.

24. A machine for snipping vamps comprising in combination a substantially U shaped vamp throat guide adjustable to conform to vamps of different curvature, and snipping blades adjustable to the crown of said guide.

25. A machine for snipping vamps comprising in combination a vamp throat guide having a continuous variable curvature, and snipping blades conformable to the curvature of said guide.

26. A machine for snipping vamps comprising in combination an adjustable vamp throat guide conformable in its various adjustments to the entire throat of a vamp, and snipping blades adjustable to said guide.

27. A machine for snipping vamps comprising in combination an adjustable vamp throat guide conformable in its various adjustments to the entire throat of a vamp, and snipping blades adjustable to vamp throats of varying curvature through the instrumentality of said guide.

28. A machine for snipping vamps comprising in combination snipping blades, an integral vamp throat guide, and means for adjusting said blades and guide to conform to the contour of vamp throats of different curvature.

29. A machine for snipping vamps comprising in combination snipping blades, a combined blade-and-vamp-throat guide, and means to adjust said guide, thereby to adjust said blades and to conform the guide to vamps of differing contour.

In testimony whereof, I have signed my name to this specification, in the presence of two subscribing witnesses.

GEORGE F. DUNN.

Witnesses:
HENRY T. WILLIAMS,
ROBERT H. KAMMLER.

---

Copies of this patent may be obtained for five cents each, by addressing the "Commissioner of Patents, Washington, D. C."